US009175909B2

(12) United States Patent
Carter et al.

(10) Patent No.: US 9,175,909 B2
(45) Date of Patent: Nov. 3, 2015

(54) REFRACTORY INSULATING MODULE

(71) Applicant: TEMTEK SOLUTIONS INC., McKees Rocks, PA (US)

(72) Inventors: Douglas Scott Carter, Valencia, PA (US); Jonathan Richard Lee Whaley, McMurray, PA (US); Lee Robert Whaley, Pittsburgh, PA (US)

(73) Assignee: Temtek Solutions, Inc., McKees Rocks, PA (US)

(*) Notice: Subject to any disclaimer, the term of this patent is extended or adjusted under 35 U.S.C. 154(b) by 106 days.

(21) Appl. No.: 14/175,662

(22) Filed: Feb. 7, 2014

(65) Prior Publication Data

US 2015/0226486 A1 Aug. 13, 2015

(51) Int. Cl.
*B32B 3/06* (2006.01)
*F27D 1/00* (2006.01)
*F27D 1/06* (2006.01)

(52) U.S. Cl.
CPC ................ *F27D 1/0009* (2013.01); *F27D 1/06* (2013.01)

(58) Field of Classification Search
CPC ........ F27D 1/063; F27D 1/0013; F23M 5/00; Y10T 428/24215; Y10T 428/24008
USPC ..................... 428/33, 57; 52/747.13; 110/336
See application file for complete search history.

(56) References Cited

U.S. PATENT DOCUMENTS 3,993,237 A 11/1976 Sauder et al.
4,154,975 A 5/1979 Sauder et al.
4,379,382 A 4/1983 Sauder et al.
5,348,468 A 9/1994 Graf et al.
6,772,517 B2 8/2004 Takeda et al.
7,919,039 B2 4/2011 Kanka et al.
7,938,877 B2 5/2011 Liu et al.
8,080,210 B2 12/2011 Hornback
8,309,212 B2 11/2012 Vandura et al.
2003/0044231 A1 3/2003 Anvick
2004/0006933 A1* 1/2004 Skettle et al. ................ 52/127.1

FOREIGN PATENT DOCUMENTS

GB 874391 * 8/1961

OTHER PUBLICATIONS

Rath AG product bulletin for Altra®, Alsitra and Calsitra High Temperature Insulation Wool (Sep. 2008)—http://www.aktec.tc/katalog/rath/RathHTIW200809_en.pdf.

* cited by examiner

*Primary Examiner* — Alexander Thomas
(74) *Attorney, Agent, or Firm* — Foley & Lardner LLP

(57) ABSTRACT

Refractory modules and other insulating modules, which include a plurality of insulating module layers arranged with their major surfaces in a side-by-side orientation, are provided. Each insulating module layer includes a first section having a slot extending into a joint edge and a second section having a tab extending from a joint edge. The first and second sections each comprise a refractory insulation material, which typically includes a fibrous refractory material. The tab has an outer contour and the slot has an inner contour which substantially corresponds in shape such that when the tab is inserted in interlocking engagement into the slot, the joint edges of the first and second sections are held in juxtaposition along a section juncture.

27 Claims, 11 Drawing Sheets

REFRACTORY INSULATING MODULE

BACKGROUND

Refractory materials formed from mats or blankets of ceramic fibers are routinely used to line the interior of high temperature furnaces and other devices involving exposure to high temperature conditions. The insulating materials are typically formed from layers of fibrous refractory material that are often assembled into modules, which may have a cube-shape. The cube-shape is commonly utilized to facilitate post manufacturing shipping, handling and installation. The layers of fibrous material may be held together by a variety of methods and each layer is commonly composed of the same material throughout. As illustrated in FIG. 1, the layers are typically assembled in a side-by-side orientation such that each layer extends completely across from the hot face through to the cold face on the opposite side of the module. Such modules are commonly installed on an interior furnace wall such that the hot face is exposed to the interior of the furnace and the cold face is mounted against the furnace wall.

When a furnace is designed to operate at very high temperature, e.g., such that the furnace walls must be capable of withstanding temperatures in the range of 2000° F. up to 3000° F., the ceramic materials capable of withstanding such conditions can be quite expensive. In general, only the outer portion on the hot face of the module is actually exposed to these very high temperatures, since the insulating effect of the ceramic fiber material will allow a substantially lower temperature to be maintained on the cold face of the module against the furnace interior wall. In furnaces insulated on the interior with such insulating modules, it is quite common for the temperature on the furnace casing next to the cold face of the module to be maintained at a temperature that is substantially cooler, e.g., about 1,000° F. or more, cooler than the hot face of the module. If the module is composed of insulating layers of a single material that extend all the way from the hot face to the cold face of the module, this means that the expensive insulating fibrous refractory material necessary to withstand the very high temperatures on the hot face must be used throughout the module, a solution which is not cost effective.

Efforts have been made to design insulating modules that employ two types of ceramic materials, with an expensive ceramic material rated for very high temperatures on the hot face and a less expensive material with a lower temperature rating on the cold face. The approaches reported to date suffer from various disadvantages. For example, U.S. Pat. No. 4,379,382 describes a high temperature insulation module having one type of ceramic fiber mat on the hot face and a second fiber mat on its cold face. The two ceramic mats are held together by a planar support member positioned between the mats. The two ceramic mats are either bonded to the support member by layers of cement applied to the outer periphery of the support member or by means of pins or clips attaching a mat to the support member. Either method of attachment can be subject to failure under certain conditions as well as the support member, which is commonly formed from metal, being potentially subject to deterioration due to corrosion.

SUMMARY

The present application relates to refractory modules, insulating modules for lining an interior surface of a furnace wall and other compositions, which may be used to provide insulation in devices designed for use under high temperature conditions, e.g., temperatures in the range of 2,000 to 3000° F. The present modules may be comprised of at least two insulating module layers or elements and typically include a plurality of such layers/elements positioned in a side-by-side orientation. The insulating module layers may include a fibrous refractory material, such as a fibrous refractory blanket or mat. Each module layer or element may include hot face and cold face sections having joint edges held in juxtaposition along a section juncture(s) by the interlocking engagement of one or more tabs extending from a joint edge of a section with correspondingly positioned and dimensioned slots in a joint edge of another section. The inner contour of the slot commonly substantially corresponds in shape to the outer contour of its paired tab. Commonly, at least some portion of each tab's outer contour extends laterally in an outward direction from the base of the tab.

In some embodiments, each module layer may include first and second sections having joint edges held in juxtaposition along a section juncture by a single tab in one section inserted into a slot in the other section. The inner contour of the slot commonly substantially corresponds in shape to the outer contour of the tab. Where at least some portion of the tab's outer contour extends laterally in an outward direction from a perpendicular to the base of the tab, the interlocking engagement of the tab and the correspondingly shaped slot are said to form a "puzzle joint." For example, the first section may have a slot extending into a joint edge thereof and the second section may have a correspondingly shaped tab extending outwardly from a joint edge. The tab typically may have an enlarging profile outer contour and the inner contour of the slot has a shape which substantially corresponds to the tab's outer contour. The first and second sections may be positioned to form an insulating module layer, e.g., as shown in FIG. 3, such that the tab on the second section is interlockingly engaged with the correspondingly shaped slot in the first section, thereby holding the joint edges of the two sections in juxtaposition along a section juncture to form the insulating module layer.

In one embodiment of an insulating module, each insulating module layer includes a first section having a slot extending thereinto from a first joint edge; and a second section having a tab extending from a second joint edge; wherein the tab has an enlarging profile outer contour and the slot has an inner contour which substantially corresponds to the tab outer contour; and the first and second sections are secured together by the tab being inserted into the slot to form a puzzle joint, such that the first and second joint edges are positioned with respect to each other to form a section juncture. The first and second sections are commonly each formed from a fibrous refractory material, e.g., fibrous refractory blanket or mat. A plurality of the insulating module layers may be held together with their major surfaces positioned in a side-by-side orientation. The adjacent layers may have been compressingly engaged, e.g., by application of a compression force in a direction substantially perpendicular to the major surfaces of the layers. As used herein, the term "adjacent layers" refers to any two layers which are positioned such that the two layers have major surfaces positioned immediately adjacent each other (i.e., with no other layers interposed therebetween). In some instances, the compressing engagement of adjacent layers may be the only feature holding the insulating module layers positioned in a side-by-side alignment, i.e., no high temperature cement or other adhesive and no clips and/or elongated plastic fasteners is used to hold the layers in position.

In some embodiments of the insulating module, adjacent insulating module layers have section junctures located in a manner such that the section junctures are offset with respect to each other, i.e., the section junctures in adjacent insulating module layers do not "cross" or overlap. In such embodiments, it is very common to have the extension length of each tab be less than the offset distance between the section juncture in that layer and the section juncture in the immediately adjacent layer(s). The offset distance between the section junctures in adjacent insulating module layers is typically somewhat greater than the extension length of the tab(s) in each layer. In certain of these embodiments, each tab may have an extension length, which is substantially the same as a preset tab extension length; and the section juncture in each layer is offset from the section junctures in adjacent layers by a distance which is greater the tab extension length. In many embodiments, the offset distance between the section junctures in adjacent insulating module layers may be at least about 120% and, more commonly, at least about 130% of the tab extension length. In some embodiments, the offset distance between the section junctures in adjacent insulating module layers is about 120% to 150% of the tab extension length.

In other embodiments, the present application provides an insulating module which includes a plurality of insulating module elements, where each insulating module element may include one or two hot face pieces, which may be formed from fibrous refractory blanket, and one or two cold face pieces, which may also be formed from fibrous refractory blanket (typically a different fibrous refractory blanket material from that used to form the hot face piece(s)). For example, an insulating module element may be formed by folding a "hot face" fibrous refractory blanket in a "U-shape" and joining the ends ("joint edges") of the U-shaped piece to the joint edges of two straight pieces of "cold face" fibrous refractory blanket. Each of the "cold face" fibrous refractory blanket sections may have one or more tabs extending from the tab joint edge thereof. The U-shaped folded hot face fibrous refractory blanket may have one or more slots extending into its two joint edges. The slots may be configured to be aligned with paired tabs extending from the tab joint edges of the two cold face sections where for each tab/slot pair, the slot has an inner contour which substantially corresponds in shape to the outer contour of the paired tab. This allows the tab/slot pairs to be interlocking engaged and hold the tab joint edges of the two cold face pieces in juxtaposition with the joint edges of the U-shaped piece along respective section junctures. The "hot face" fibrous refractory blanket U-shaped piece is often folded such that the two joint edges are offset, typically such that the offset distance is greater than the tab extension lengths of the tabs extending from the two cold face sections. In other embodiments in which the insulating module elements include a U-shaped folded piece of fibrous refractory blanket, the cold face portion of the element may be formed from the U-shaped piece. In such embodiments, the "hot face" of the element may be formed from two "hot face" fibrous refractory blanket pieces. In still other embodiments, both the cold face and hot face portions of the element may both be formed from U-shaped folded fibrous refractory blanket. In each of these embodiments, the joint edges of the hot face piece(s) typically have slots positioned and shaped to receive correspondingly shaped paired tabs in interlocking engagement.

In some embodiments, the insulating module may include a support member having at least one elongated anchor rod attached thereto. A plurality of the insulating module layers or elements may be mounted on the anchor rod. The anchor rod may be dimensioned to extend at least partially through the insulating module, e.g., so that it extend in an orientation transverse to the major surfaces of at least two of the insulating module layers or elements. Typically the anchor rod is dimensioned such that it extends transversely through at least a majority of the insulating module layers (or elements) in the module.

BRIEF DESCRIPTION OF THE DRAWINGS

For a more complete understanding of the features and advantages of the present insulating modules, reference is now made to the detailed description section along with the accompanying figures and in which.

DETAILED DESCRIPTION

While making and using various embodiments of the present method and composition are discussed in detail below, it should be appreciated that the present application provides many applicable inventive concepts that can be embodied in a wide variety of specific contexts. The specific embodiments discussed herein are merely illustrative of specific ways to make and use the present method and apparatus and are not intended to limit the scope of the invention.

Figure 1:
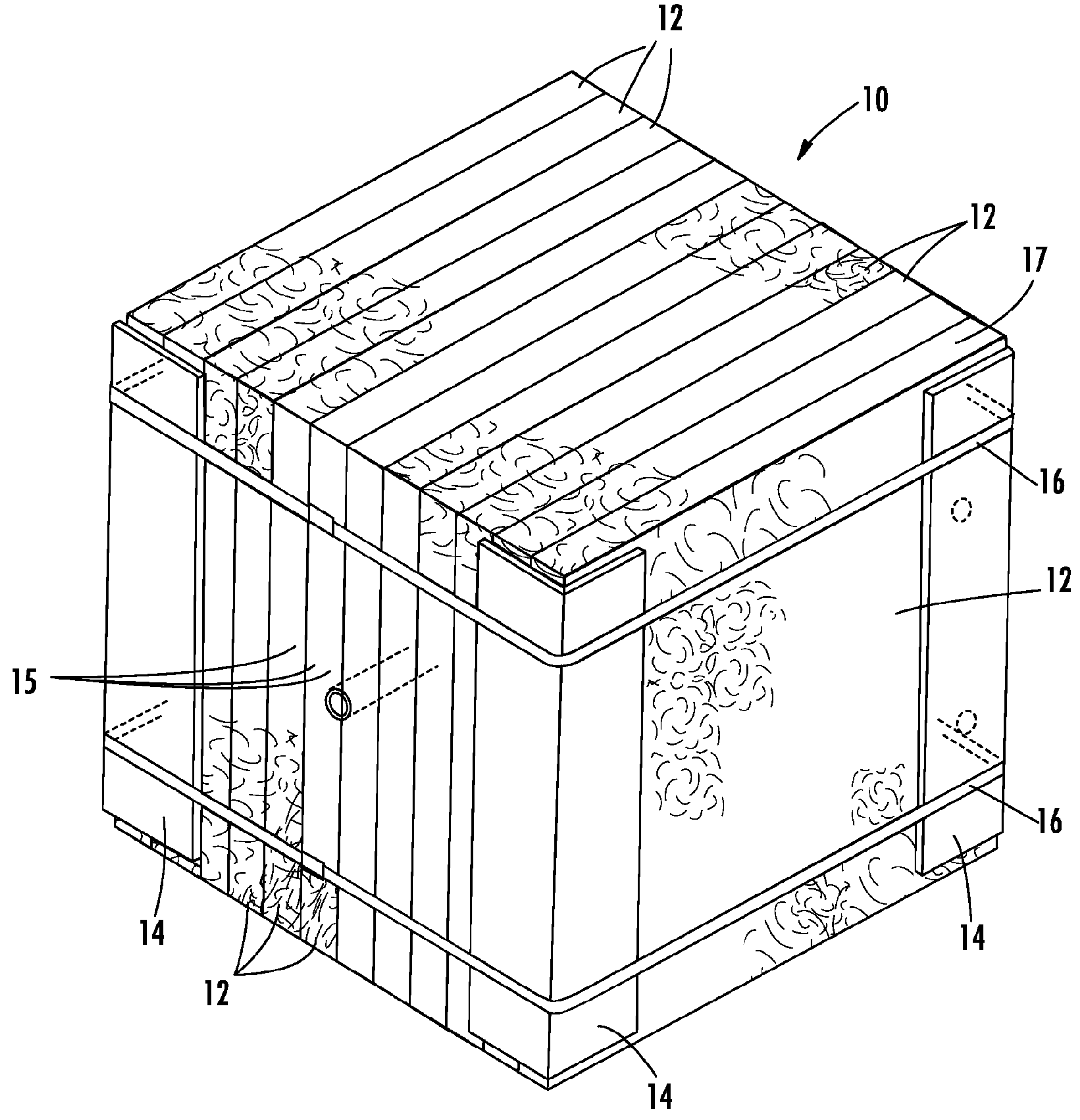
FIG. 1 PRIOR ART
FIG. 1 is a perspective view of a conventional prior art refractory module with the layers of insulating material held in place by cardboard corner panels and bands extending around the module. The layers are assembled in a side-by-side orientation such that each layer extends completely across from the hot face through to the cold face on the opposite side of the module.
Figure 2:
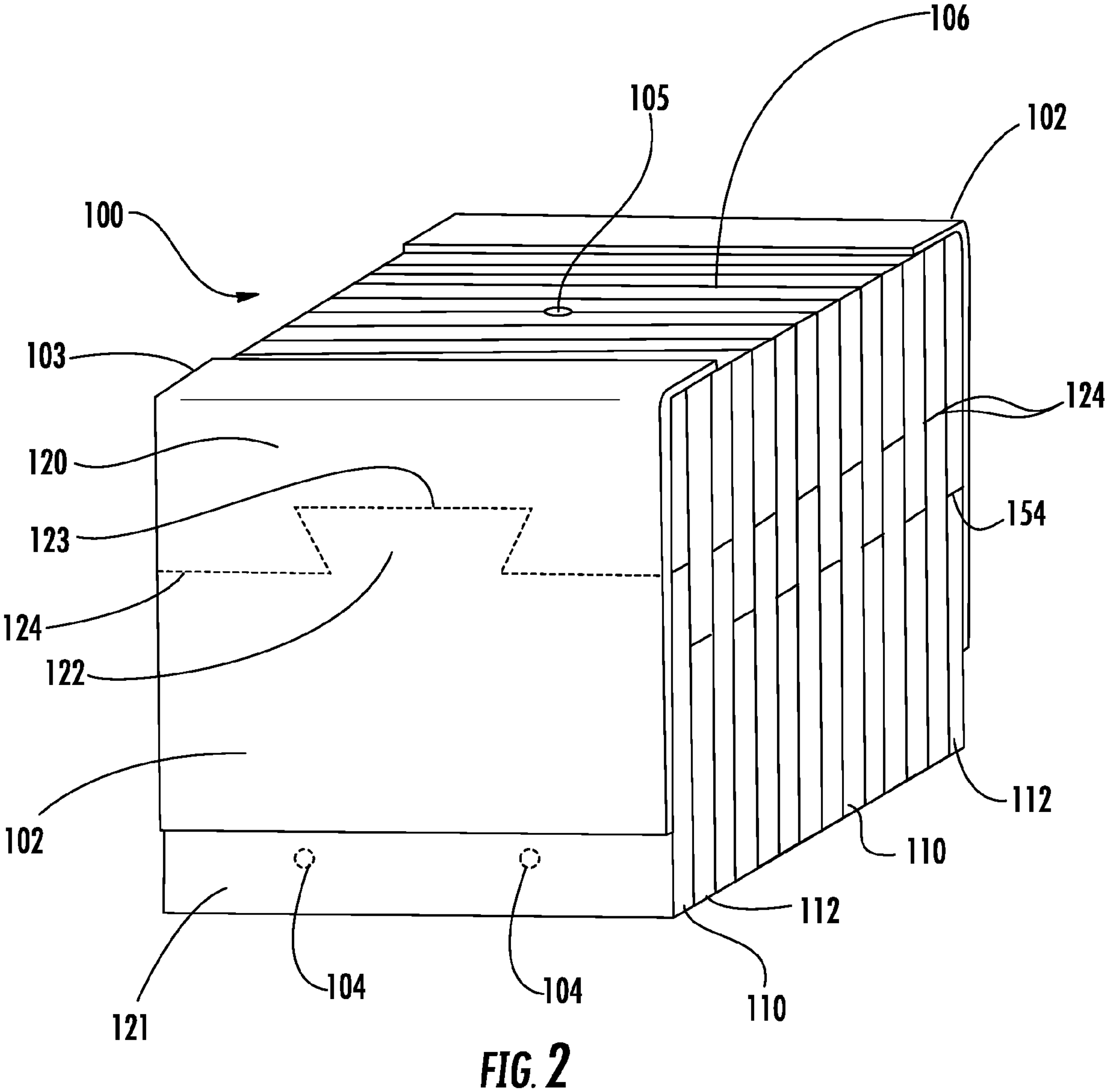
FIG. 2 is a perspective view of an illustrative insulating module according to the present application, which includes include L-shaped cardboard covering pieces extending around certain portions of the module to protect the insulating module layers from distortion by the type of banding typically employed to maintain the configuration and orientation of the insulating module layers during shipping and handling.

Referring to FIG. 2, one example of an illustrative embodiment of an insulating module 100 according to the present application is shown. The insulating module 100 includes a plurality of insulating module layers 110, 112 of a refractory insulation material (e.g., fourteen (14) layers as shown in the embodiment depicted in FIG. 2). Each layer includes first and second sections 120, 121 joined together along a section juncture 124 to form the insulating module layers 110. The first and second sections 120, 121 are joined together and held in place by a tab 122 extending from the joint edge of the second section 121 inserted into a slot 123 extending into the joint edge in the first section 120. The shape of the inner contour of the slot 123 which substantially corresponds to the outer contour of the tab 122, such that the tab and slot fit together to form a puzzle joint. Engagement of the tab 122 in the slot 123 holds the joint edges of the first and second sections 120, 121 in juxtaposition along section juncture 124. The embodiment of the insulating module 100 depicted in FIG. 2 also includes spaced apart holes 104 provided through the second section 121 of the insulating module layers 110, 112 which are dimensioned and adapted to receive an anchor rod of a mounting assembly. The insulating module 100 depicted in FIG. 2 also includes a passage 105 in its top face 106 to allow a tool, such as an elongated wrench or screw driver, to be inserted through the module to facilitate securing the module to a furnace wall during installation. As depicted in FIG. 2, when banding wrapped around the outside of the module is used to keep the layers in position during shipping and handling, the insulating module may also include L-shaped cardboard covering pieces 102 to protect the insulating module layers 110, 112 and prevent the banding from distorting the refractory insulation material of the insulating module layers.

Figure 3:
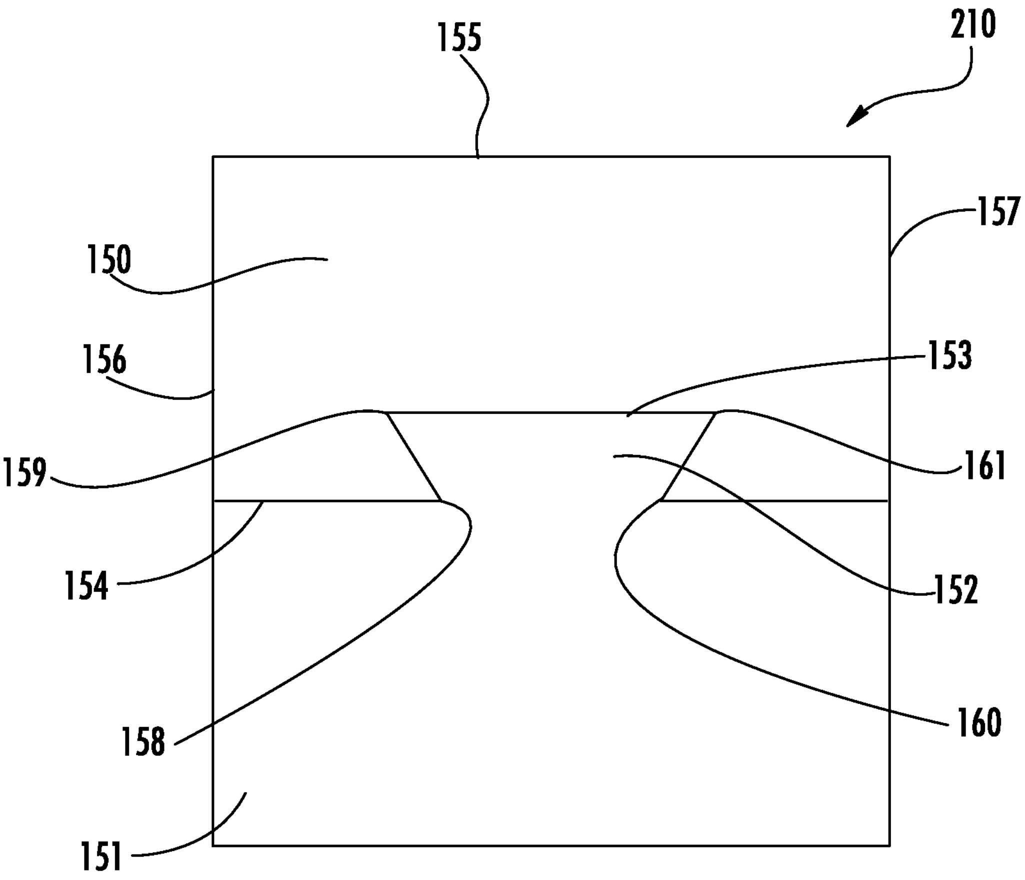
FIG. 3 is an end view of the insulating module of FIG. 2 showing a major face of an outermost insulating module layer with a tab inserted into a corresponding slot to form a puzzle joint holding the two insulating layers sections together along a section juncture.

FIG. 3 shows an end view depicting the outermost insulating module layer 210 of an illustrative embodiment of an insulating module according to the present application. The module layer 210 includes first and second sections 150, 151 joined together along a section juncture 154. The first and second sections 150, 151 are held in place by the interlocking engagement of tab 152 extending from second section 151 into slot 153 in first section 150. As with the embodiment depicted in FIG. 2, the shape of the inner contour of the slot 153 substantially corresponds to the outer contour of the tab 152, such that the tab and slot fit together to form a puzzle joint. The tab suitably has an enlarging outer contour, such as depicted for tab 152 in FIG. 3. As used herein, the term "enlarging outer contour" refers to a tab having an outer contour in which the width of the tab along at least one line parallel to the tab base (defined in FIG. 3 by a line between points 158 and 160) is larger than the width of the tab base 158/160. In the example shown in FIG. 3, the width of any line parallel to the tab base and, in particular, the outer edge 153 (defined by the line 159/161) of tab 152 is larger than the width of the tab base 158/160. In the embodiment depicted in FIG. 3, the tab 152 has an enlarging trapezoidal outer contour. However, tabs having other enlarging shapes may be suitably employed to form the insulating module layers of disclosed in the present application. For example, FIG. 9 described below shows a number of other suitable tab configurations, with enlarging outer contours, which may be used to join together sections of the insulating module layers. As used herein, the term "tab extension length" refers to the longest dimension of a tab extending from the tab base along a line perpendicular to the tab base. For example, in the example shown in FIG. 3, the tab extension length would be the distance from tab base defined by points 158 and 160 along a line perpendicular to the tab base to outer tab edge 153. In many embodiments, the tabs suitably have a tab extension length of about one to two inches.

Figure 4:
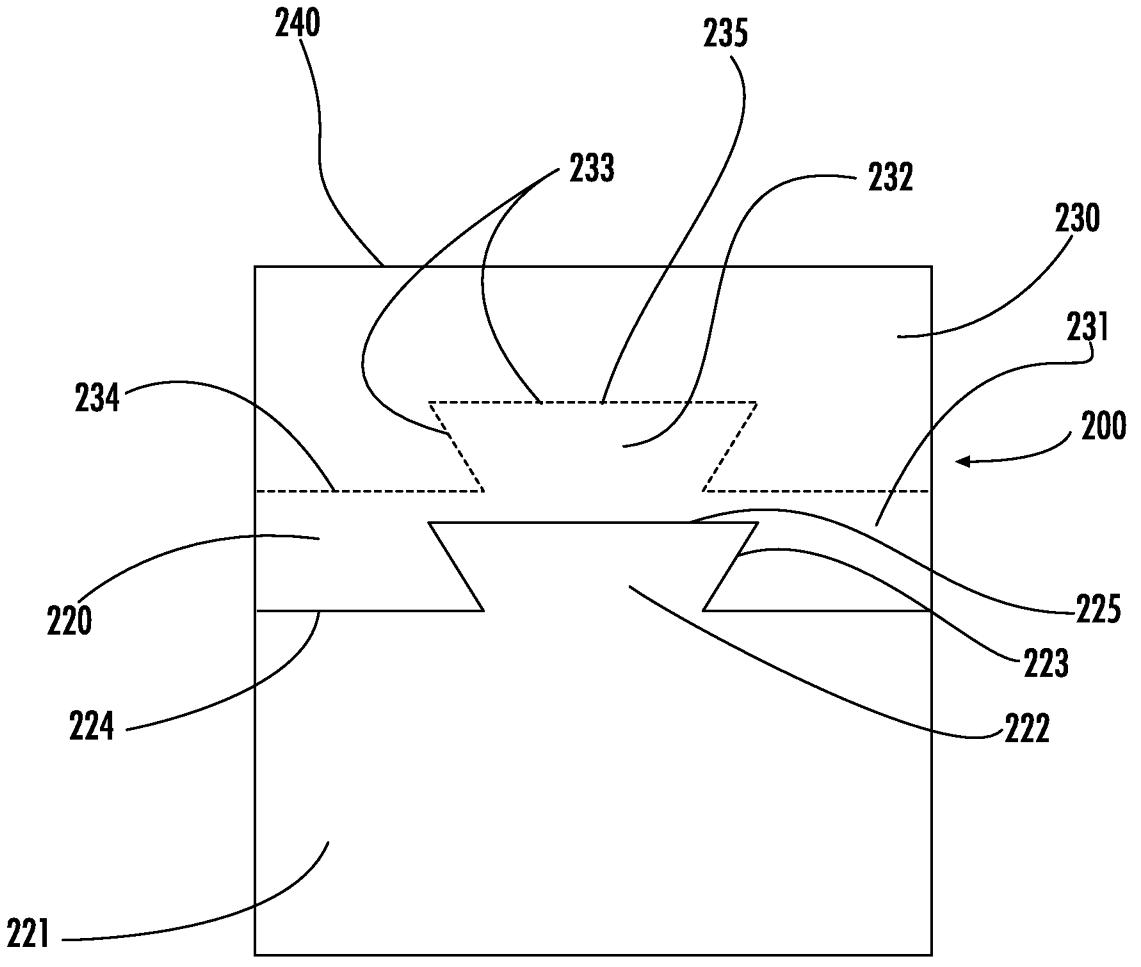
FIG. 4 is a schematic view of the major face of an outermost insulating module layer shown in FIG. 3, which shows the relative positioning of the puzzle joints in each layer and offset in the section junctures in the outermost insulating module layer and the immediately adjacent insulating module layer.

FIG. 4 depicts a schematic view of another illustrative embodiment of an insulating module according to the present application showing the relative positioning of puzzle joints and section junctures in the outermost insulating module layer 200 and the adjacent insulating module layer. The outermost module layer 200 includes first and second sections 220, 221 joined together along a section juncture 224. The first and second sections 220, 221 are held in place by the interlocking engagement of tab 222 extending from second section 221 with slot 223 in first section 220. As with the embodiment depicted in FIGS. 2 and 3, tab 222 has an enlarging trapezoidal shape to which the inner contour of slot 223 corresponds substantially in shape. The immediately adjacent insulating module layer has two sections 230, 231 which are similarly joined together by the interlocking engagement of similarly shaped tab 232 with slot 233. In the embodiment shown in FIG. 4, the section juncture 234 in the adjacent insulating module layer is offset from the section juncture 224 in the outermost insulating module layer 220 by a distance (224, 234) that is greater than the tab extension length of tab 222 and, typically, is offset by a distance that is at least about 120% of the tab extension length. As a result of the offset of section junctures 224, 234, the uppermost edge of tab 222 does not extend far enough to overlap with section juncture 234. The size and placement of tab 232 is commonly selected such that the distance from the uppermost edge of tab 232 permits sufficient insulating material between tab 232 and the hot face 240 of the module 200 to maintain a sufficiently lower temperature to be maintained in the interior of the module such that lower sections 221, 231 can be formed from a less expensive refractory insulation material with a lower temperature rating, e.g., a material with a temperature rating which may be at least about 100° F. lower, typically at least about 300° F. lower (and often about 400 or 500° F. lower)

than the temperature rating of the refractory insulation material, which forms sections 220, 230 on the hot face 240 of the module 200.

Figure 5:
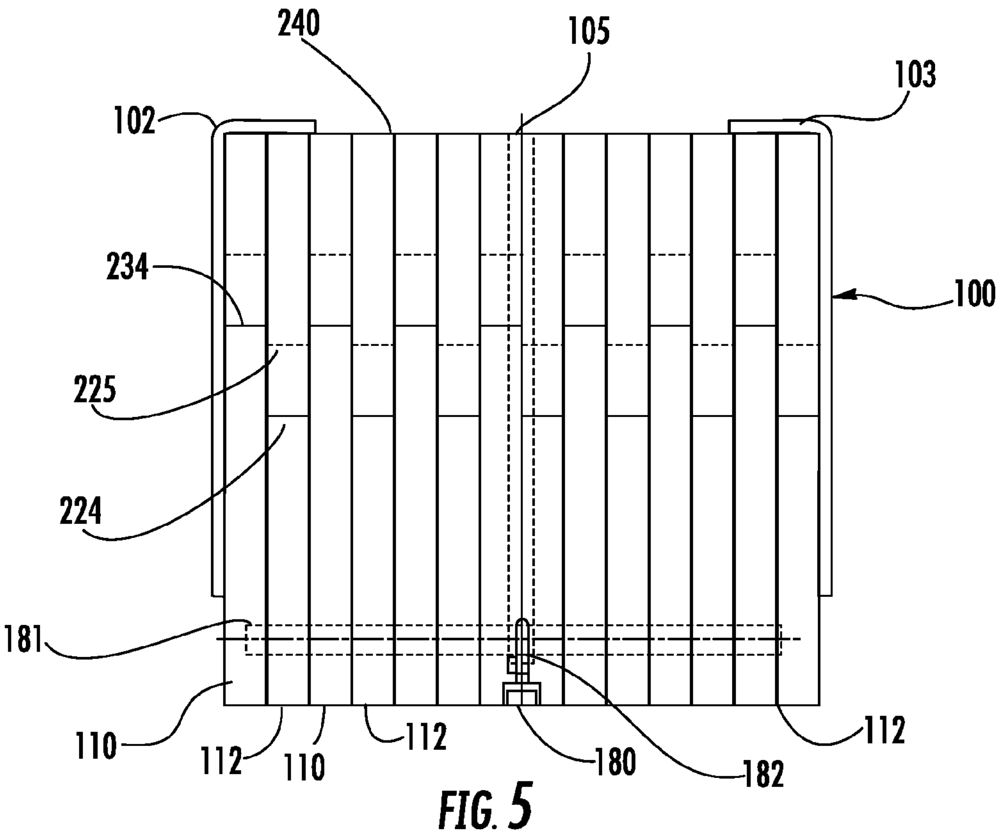
FIG. 5 is a side view of the insulating module of FIG. 2 showing edge views of the insulating module layers with offset section junctures in each pair of adjacent insulating module layers, and schematically depicting the position and orientation of the rods and mount of a fastening device for attaching the module layers and the insulating module to an inner surface of a furnace.

FIG. 5 is a side view of the insulating module shown in FIGS. 2 and 4 showing edge views of the insulating module layers 110, 112. As shown in FIG. 5, the section junctures 224, 234 in each pair of adjacent insulating module layers 110, 112 are offset from each other such that the uppermost edge 225 of tab 222 on the lower section 221 of layer 112 does not overlap with section juncture 234 in layer 110. FIG. 5 also schematically depicts the position and orientation of the anchor rods 181 and mount 182 of a fastening device 180 for attaching the insulating module 100 to an inner surface of a furnace. The anchor rods 181 are disposed in a transverse orientation through the lower section of each of insulating module layers 110, 112. As shown, the length of the anchor rods 181 is generally selected so that the rods 181 do not extend completely through the outermost of the insulating module layers 110, 112. Also shown is the positioning of an access passage 105 extending through the insulating module 100 from the hot face 240 to enable access to support mount 180 with an appropriate tool to facilitate mounting of the module 100 on a furnace wall. The access passage 105 may include a removable inner sleeve or tube (not shown) to maintain the integrity of the passage 105 during handling and installation, which can be removed by withdrawal through the hot face 240 after installation of the module 100.

As described herein, the insulating module may include an access passage 105, which allows a tool to be is inserted into the hot face of the module and engages a fastening device for attaching the insulating module to the surface of a furnace casing. In some embodiments, the insulating module may include a removable sleeve portion (not shown) which ensures that the passage remains open. Following the attachment operation, as the tool is withdrawn, the removable sleeve portion may be manually removed from the module through its hot face following attachment or affixation to the furnace wall. As noted above, access to the fastening device 180 is gained through the hot face 106 of the module. That is, the fibrous refractory material comprising the hot face of the module may be displaced to gain access to the fastener and to perform the attaching operation. Once the attachment has taken place and the tool removed, the refractory fibers generally will relax and fill the passage 105. In some instances, the refractory fibers may not be sufficiently resilient to allow this to occur immediately after removal of the attachment tool. To facilitate the rearrangement of the fibrous material, the hot face of the module may be manipulated manually to ensure closure of the passage 105.

Figure 6:
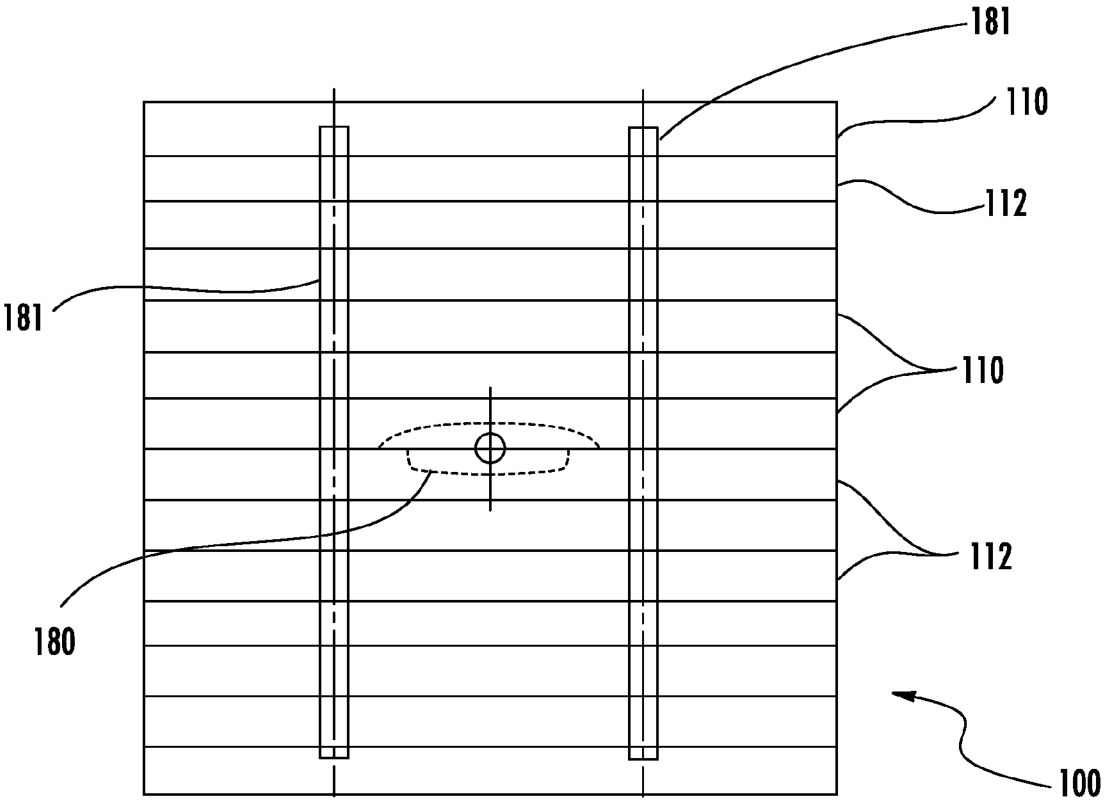
FIG. 6 is a bottom view of the insulating module of FIG. 2 showing the bottom edges of the insulating module layers and schematically depicting the position and orientation of the rods and mount of a fastening device for attaching the module layers and the insulating module to an inner surface of a furnace.

FIG. 6 is a bottom view of the insulating module 100 of FIG. 2 showing the bottom edges of the insulating module layers 110, 112. FIG. 6 also schematically depicts the position and orientation of the anchor rods 181 and mount 182 with respect to the module layers 110, 112 of the fastening device 180 for attaching the insulating module to an inner surface of a furnace. As shown in FIG. 6, the anchor rods 181 are disposed in a transverse orientation through each of insulating module layers 110, 112. In the exemplary module shown in FIG. 6, the length of the anchor rods 181 is selected so that the rods 181 only extend partially into the outermost of the insulating module layers 110, 112.

Figure 7:
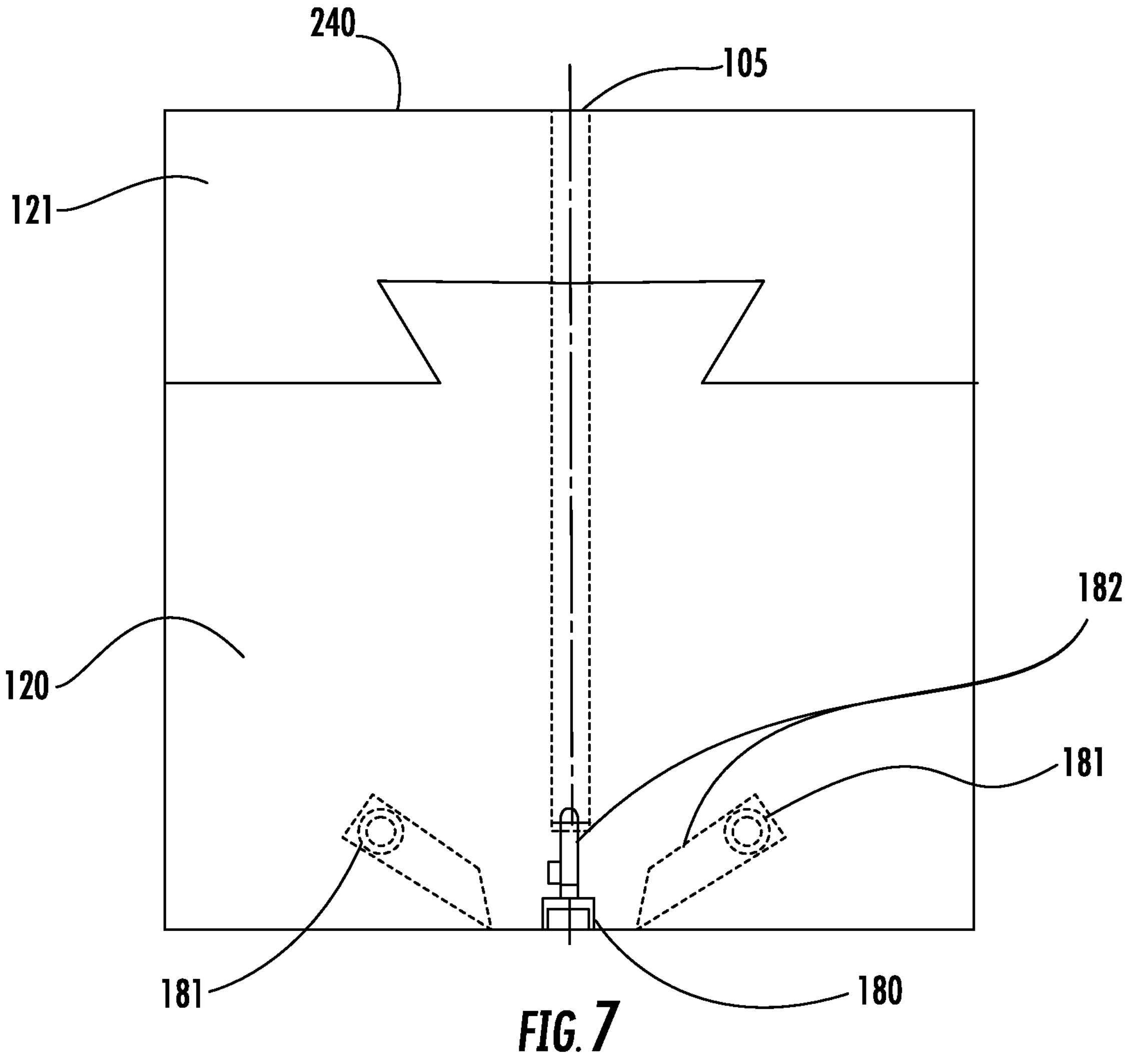
FIG. 7 is another end view of the insulating module of FIG. 2 showing a major face of an outermost module layer and schematic depiction of the positioning of a support structure mount within the module for mounting the module to an inner surface of a furnace.

FIG. 7 is an end view of the insulating module of FIG. 2 showing opposite end on the module 100 from that depicted in FIG. 3. FIG. 7 shows a major face of an outermost module layer 110. FIG. 7 also includes a schematic depiction of the positioning of the fastening device 180 within the module for mounting the module 100 to an inner surface of a furnace. This figure shows the ends of anchor rods 181 and the support structure mount 182 of the fastening device 180. FIG. 7 also schematically shows the positioning of an access passage 105 with respect to the major face of an outermost module layer 110 as the passage 105 extends through the insulating module 100 from the hot face 240 to enable access to fastening device 180.

Figure 8:
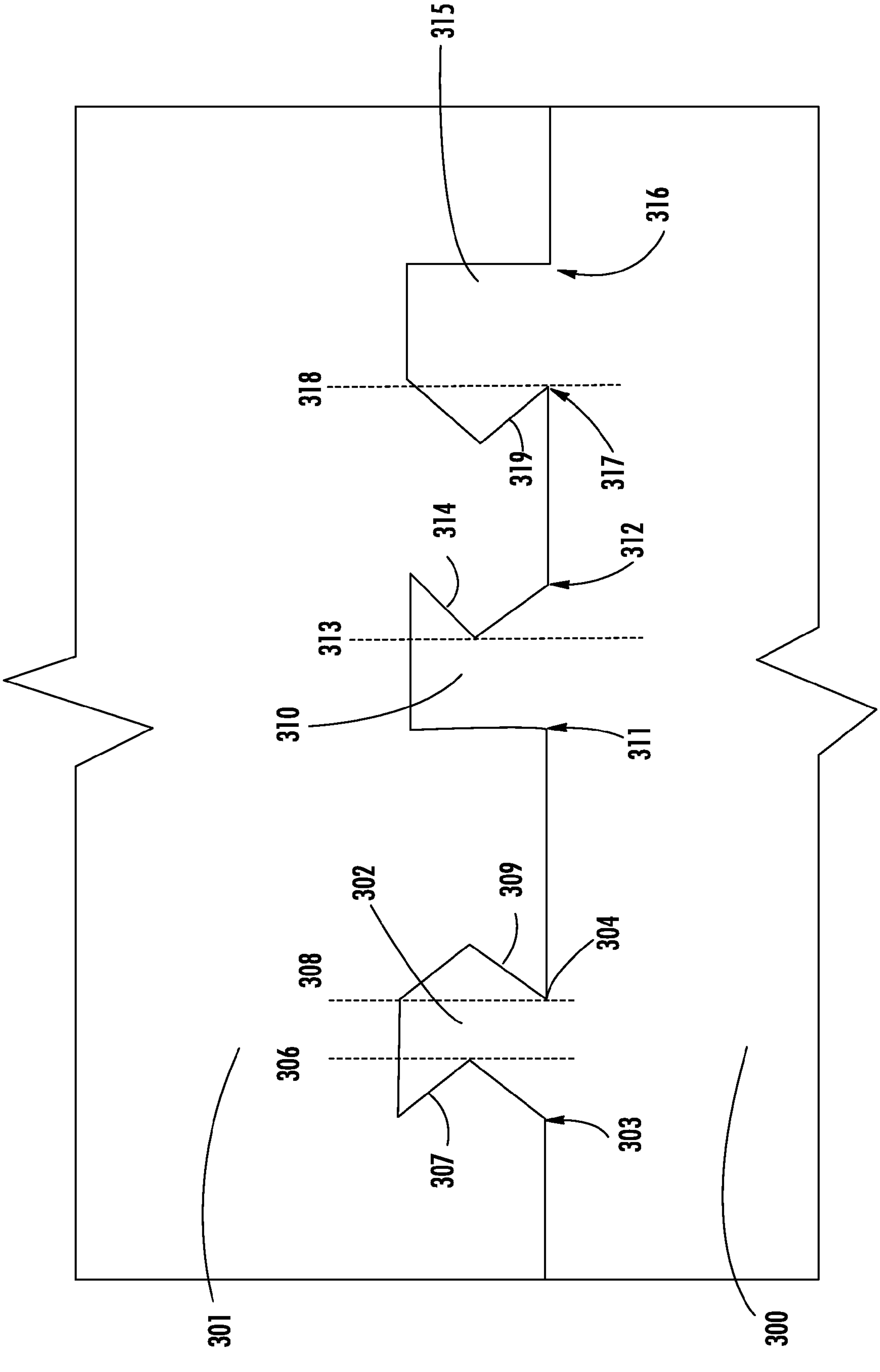
FIG. 8 depicts another exemplary configuration of a puzzle joint, which is formed by the engagement of three tab and slot pairs, that may be used to join two sections of an insulating module layer of the insulating modules described in the present application.
Figure 9:
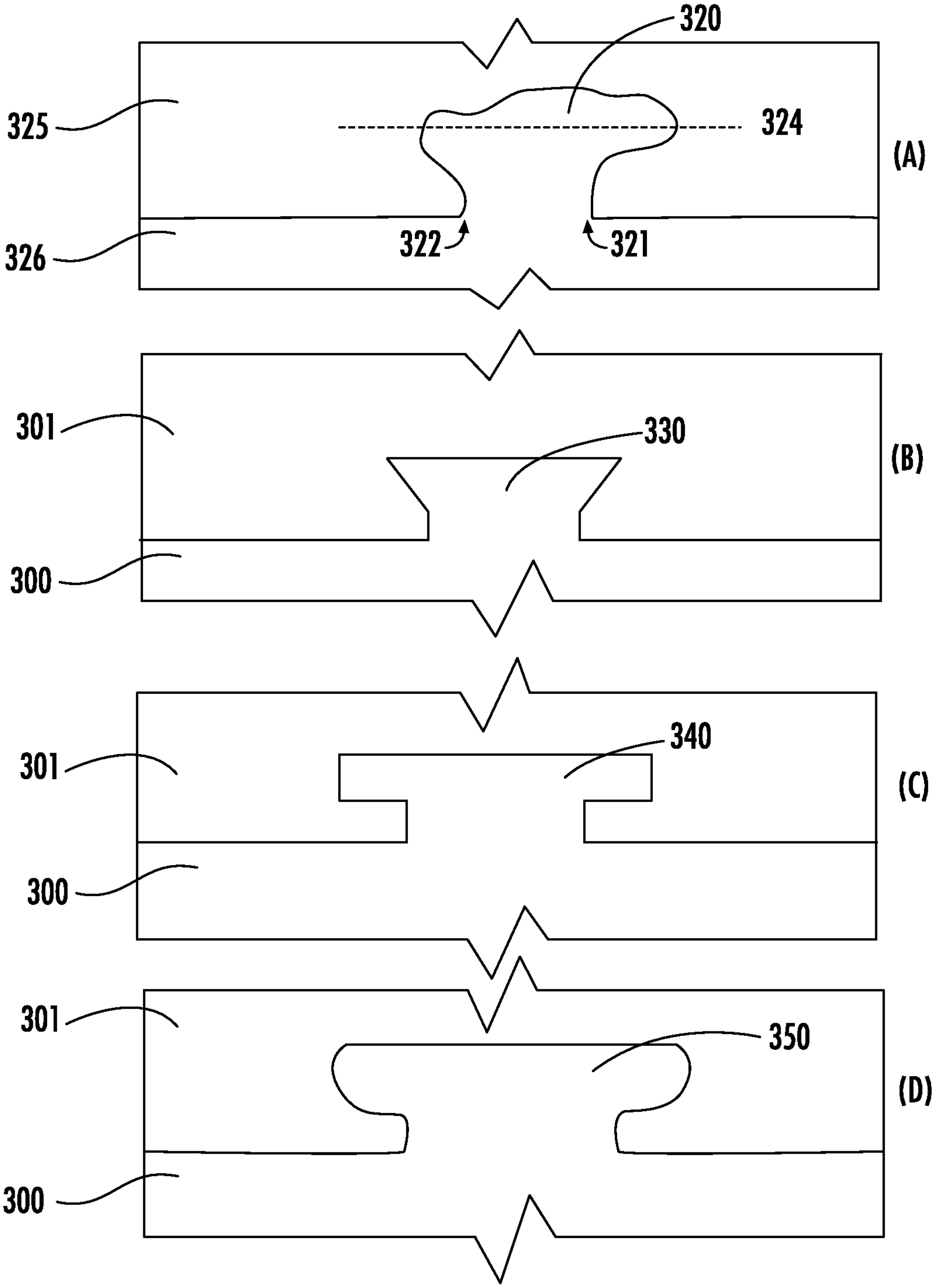
FIG. 9 depicts a number of other exemplary configurations of puzzle joints that may be used to join two sections of an insulating module layer of the insulating modules described in the present application.
Figure 10:
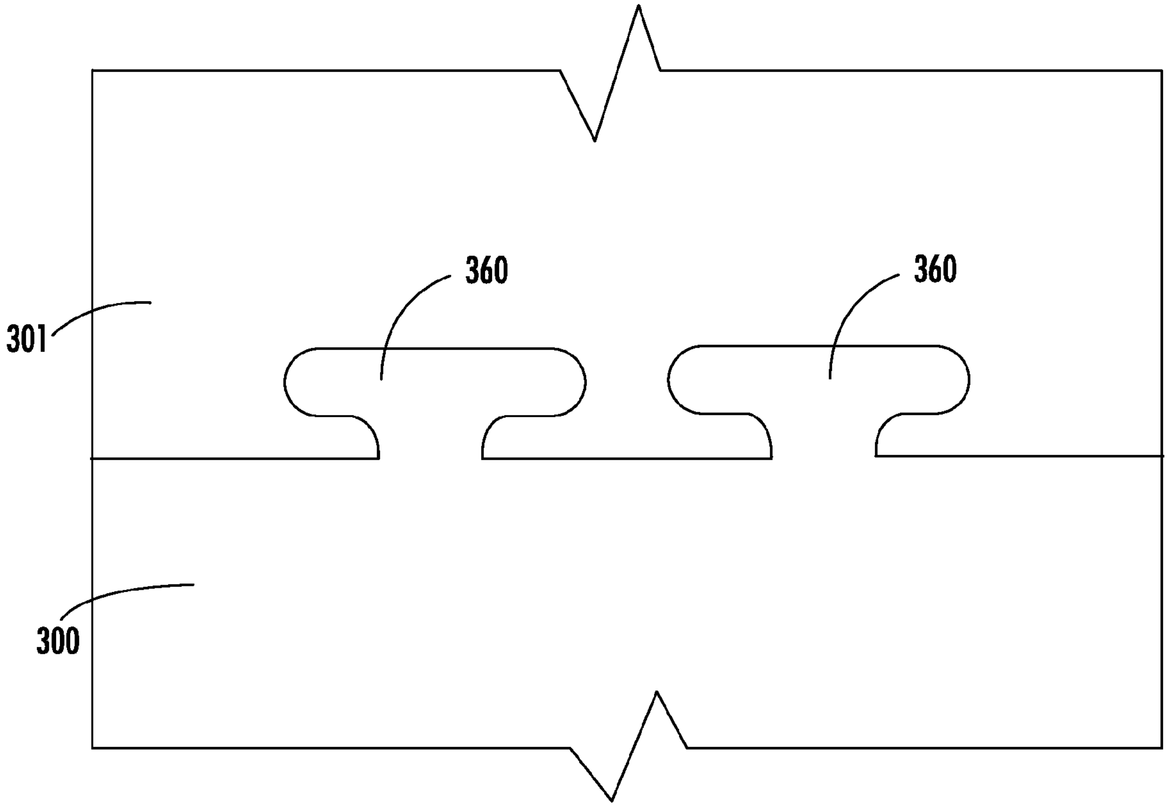
FIG. 10 depicts another exemplary configuration of a puzzle joint, which is formed by the engagement of two tab and slot pairs, that may be used to join two sections of an insulating module layer of the insulating modules described in the present application.

FIG. 9 shows a number of other exemplary configurations of puzzle joints that may be used to join two sections of an insulating module layer of the insulating modules described in the present application. The two sections of an insulating module layer according to the present application may be joined together by a puzzle joint formed by the engagement of a single tab and slot pair, as depicted in FIGS. 9A-9D. Alternatively, the two sections of an insulating module layer may be joined together by a puzzle joint formed by the engagement of two or more tab and slot pairs. Illustrative examples are depicted in FIGS. 8 and 10 where the two sections are held together by puzzle joints formed by the engagement of a two or more tab and slot pairs. All of the tab configurations shown in FIGS. 9 and 10 have an enlarging profile outer contour, i.e., an outer contour in which the tab has a shape such that the width of the tab along a line parallel to the tab base is greater than the width of the tab base. For example, in FIG. 9A the width of tab 320 along line 324 is greater than the width of the tab base defined by points 321, 322. The tab 320 shown in FIG. 9A provides an example of a tab having an irregularly shaped enlarging profile outer contour. FIG. 9B depicts a puzzle joint where tab 330 has another suitably shaped enlarging profile outer contour. The puzzle joint depicted in FIG. 9C illustrates that the tab 340 as shown may have enlarging profile outer contour with a rectangular shaped head. FIG. 9D depicts tab 350 with a similarly shaped enlarging profile outer contour to that of FIG. 9C except that the corners of the tab edges have been somewhat rounded off.

FIG. 8 depicts a puzzle joint formed by the interlocking engagement of three tab and slot pairs. In this exemplary puzzle joint configuration, the tabs 302, 310, 315 do not have an enlarging profile outer contour, since any line parallel to the tab base defined by points 303, 304 (or 311, 312 and 316, 317 respectively) has a width that is the same as or less than the width of the tab base. FIG. 8 is an illustration that the puzzle joint used to hold two sections of the present insulating module layers together may suitably include a tab having an outer contour where at least one side of the tab profile extends in an outward direction with respect to the tab base from a line perpendicular to the tab base. As illustrated by tabs 302, 310, 315, such tabs do not need to have an enlarging profile outer contour in order to satisfy this criterion. For example tab 302 has two edges of its outer contour which satisfy this criterion. In tab 302, tab edge 307 extends in an outward direction with respect to the tab base 303, 304 from perpendicular line 306 and tab edge 309 extends in an outward direction with respect to the tab base 303, 304 from perpendicular line 308. Tabs 310 and 315 each have a single edge of the outer contour which satisfies this criterion. In tab 310, tab edge 314 extends in an outward direction with respect to the tab base 311, 312 from perpendicular line 313. In tab 315, tab edge 319 extends in an outward direction with respect to the tab base 316, 317 from perpendicular line 318.

As noted above, the two sections of an insulating module layer according to the present application may be joined together by a puzzle joint formed by the interlocking engagement of two or more tab and slot pairs. FIG. 10 depicts a puzzle joint formed by the engagement of two tab and slot pairs, where each tab 360 has a similar shape to the enlarging profile outer contour of the single tab 350 shown in FIG. 8D.

Figure 11:
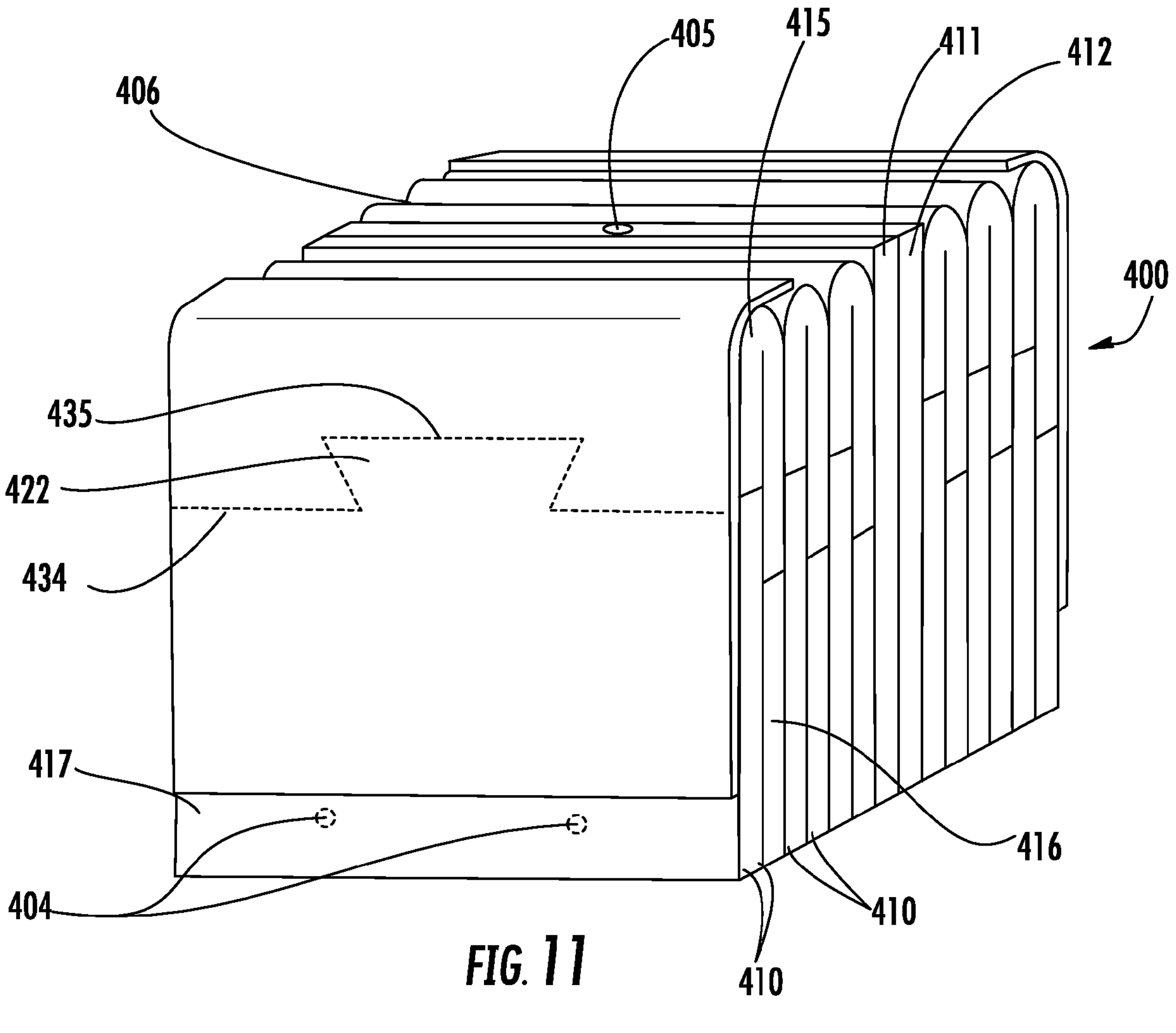
FIG. 11 is a perspective view of another illustrative insulating module according to the present application, which includes a plurality of insulating module elements arranged with their major surfaces in a side-by-side orientation; where a number of the insulating module elements include a U-shaped fibrous refractory blanket on the "hot face" joined in edge-to-edge fashion with to two "cold face" fibrous refractory blanket sections.

FIG. 11 shows another example of an illustrative embodiment of an insulating module provided by the present application. The insulating module 400 shown in FIG. 11 includes a plurality of insulating module elements 410, which have a flattened rectangular box shape and are arranged with their major surfaces in a side-by-side orientation. The major surfaces of the insulating module elements 410 have a substantially square shape (i.e., square prism shape). With the exception of the centermost insulating module elements 411, 412, the insulating module elements 410 have an upper section 415 formed by folding a "hot face" fibrous refractory blanket in a "U-shape" and joining this section 415 in an edge-to-edge manner to two straight pieces of fibrous refractory blanket 416, 417. The insulating module 400 depicted in FIGS. 11 and 12 also includes a passage 405 in its top face 406 to allow a tool, such as an elongated wrench or screw driver, to be inserted through the module to facilitate securing the module to a furnace wall during installation. In order to accommodate this passage, what would have been the centermost element with a U-shaped piece of fibrous refractory blanket on the hot face has been replaced by two cut-edge insulating module layers 411, 412. The "hot face" fibrous refractory blanket sections 415 are folded in an unsymmetrical manner such that the two joint edges 424, 434 are offset. The offset distance is greater than the tab extension length of the tabs 422 extending from lower fibrous refractory blanket 416, 417. As a result, there is no overlap between the upper edge 425 of the tab extending from lower section 417 and the section juncture 434 between U-shaped section 415 and the other lower section 416 of the insulating module elements 410. The adjacent insulating module elements 410 is arranged such that there is no overlap between the adjacent section juncture 434 between the upper edge 425 of the tab extending from lower section 417 in the outermost insulating module elements 410. In each of the insulating module elements 410, the "cold face" sections 416, 417 have a centrally positioned tab 422 extending from the tab joint edges thereof 424, 434. The U-shaped folded hot face fibrous refractory blanket has slots extending into its two joint edges 424, 434. The slots are configured such that tabs extending from the tab joint edges of the lower sections 416, 417 can be interlockingly engaged in the slots, thereby holding the U-shaped 415 in edge-to-edge juxtaposition with lower sections 416, 417 along respective section junctures 424, 434. For each tab/slot pair, the slot has an inner contour which substantially corresponds in shape to the tab outer contour. The two centermost insulating module elements 411, 412 are constructed in a similar manner to the insulating module layers 110, 112 depicted in FIG. 2-7.

Figure 12:
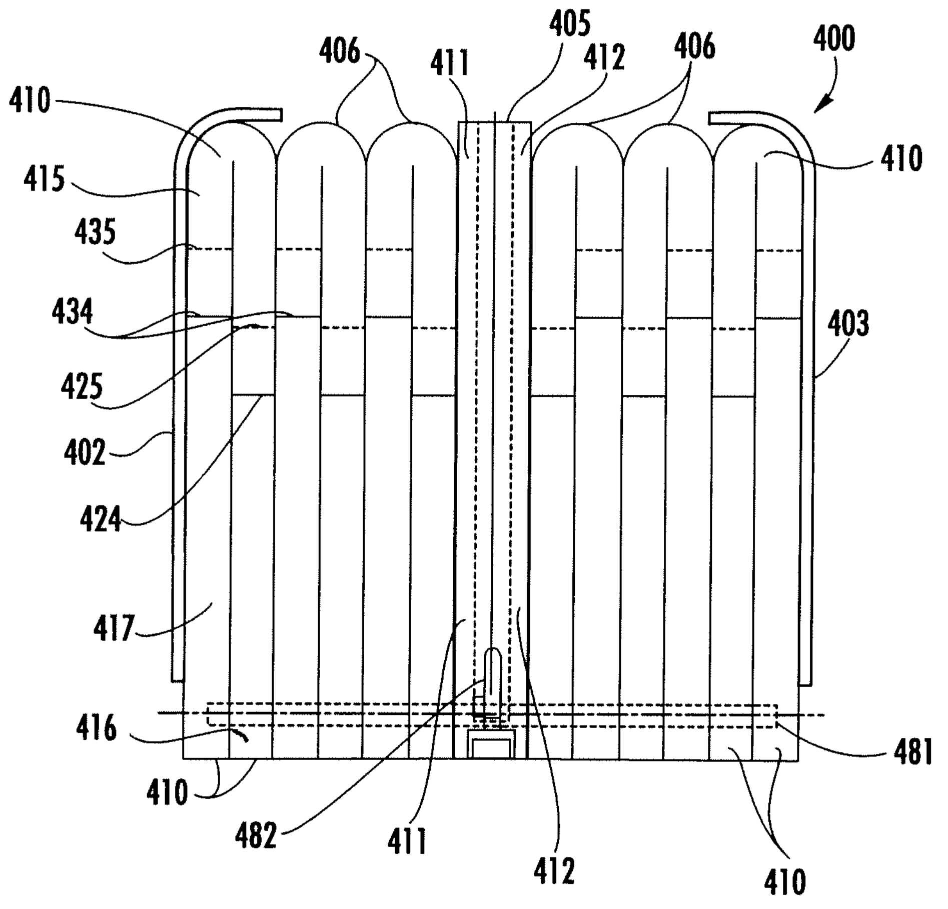
FIG. 12 is a side view of the insulating module of FIG. 11 showing edge views of the insulating module elements with offset section junctures, and schematically depicting the position and orientation of the rods and mount of a fastening device for attaching the module layers and the insulating module to an inner surface of a furnace.

FIG. 12, which shows a side view of the insulating module of FIG. 11, also schematically depicts the position and orientation of the anchor rods 481 and mount 482 of a fastening device for attaching the insulating module 400 to an inner surface of a furnace. The anchor rods 481 are disposed in a transverse orientation through the lower section of each of insulating module element 410, 411, 412. As shown, the length of the anchor rods 481 is generally selected so that the rods 481 do not extend completely through the outermost of the insulating module elements 410. Also shown is the positioning of an access passage 405 extending through the insulating module 400 from the hot face 406 to enable access with an appropriate tool to facilitate mounting of the module 400 on a furnace wall. The access passage 405 may include a removable inner sleeve or tube (not shown) to maintain the integrity of the passage 405 during handling and installation, which can be removed by withdrawal through the hot face 400 after installation of the module 400.

The present application provides a refractory module comprising a plurality of insulating module layers arranged such that their major surfaces are contacted in a side-by-side orientation. The insulating module layers are commonly formed from refractory insulation material material, e.g., from a fibrous refractory blanket or mat. Each layer includes a first section having at least one slot extending therein from a first joint edge; and a second section having at least one tab extending from a second joint edge thereof. The slot(s) has an inner contour which substantially corresponds in shape to the outer contour of the tab(s), such that when a tab is inserted in interlocking engagement into a correspondingly configured slot, the edges of the first and second sections are held in juxtaposition (typically in edge-to-edge contact) along a section juncture. In certain exemplary embodiments, each tab may have an expanding trapezoid outer contour. Typically, the sections are positioned such that all of the first sections have an edge which is exposed to the hot face of the module and all of the second sections have an edge which is exposed to the cold face of the module. The first sections typically have a tab clearance of at least about two (2) inches in order to ensure that the refractory insulation material material used to form the cold face section is not exposed temperatures which could degrade the material. As used herein, the term "tab clearance" refers to the distance between the outside edge (typically the hot face edge of the section) of an insulating module layer section with a slot in its joint edge and the closest portion of any tab from another section interlockingly engaged with the slot bearing section. For example, in the insulating module layer depicted in FIG. 3, the "tab clearance" is the distance between the hot face edge 155 of the first section 150 and the outermost extension 153 of tab 152.

In many embodiments, the first section of each insulating module layer includes a first refractory insulation material and the second section of each insulating module layer includes a second refractory insulation material which is different from the first refractory insulation material. The first and second refractory insulation materials may be formed from fibers selected from soluble fibers, fiber glass, mineral fibers, alumina fibers, zirconia fibers, alumina-zirconia fibers, alumina-silica-zirconia fibers, alumina-silica fibers (e.g., mullite fibers), and/or chromia-alumina-silica fibers. In some versions of the present insulating module, the first section of each insulating module layer includes a hot face refractory insulation material comprising mullite fibers; and the second section of each insulating module layer comprises a cold face refractory insulation material comprising alumina-silica-zirconia fibers.

In various embodiments, the major surfaces of the insulating module layers may be held in contact in a side-by-side orientation using a variety of methods known to those of skill in the art. For example, the insulating module layers may be held together in the side-by-side orientation by one or more plastic fasteners, which have an elongated filament with outwardly extending end sections. The elongated filament dimensioned to extend at least partially through at least two of the insulating module layers such that the filament end sections engage the layers and hold them in position. In other embodiments, the insulating module layers may be held in a side-by-side orientation using metal clips. In still other embodiments, the insulating module layers may be placed in side-by-side orientation and subjected to a compressive force applied a to the outer major faces of the two outermost insulating module layers until the total thickness of the combined layers has been compressed by a desired amount. Such modules may be referred to as having the insulating module layers "compressingly engaged" in side-by-side orientation. Typically, the adjacent layers have been compressingly engaged by application of a compression force in a direction substantially perpendicular to the major surfaces of the layers. In some embodiments, other than having the anchor rods of an optionally included fastening device pass transversely through the first section of the insulating module layers, such compressing engagement may be the only method employed to keep the plurality of layers positioned in side-by-side orientation. In other embodiments, in addition to these methods of holding the insulating module layers in position, the module may be wrapped or encircled by banding to aid in positioning the layers during shipping, handling and installation. In yet other embodiments, a combination of two or more of the above described methods may be employed to hold the insulating module layers in a side-by-side orientation.

In the embodiments of the insulating module layers described herein, the two sections of a layer include correspondingly shaped tab(s) and slot(s) which are configured to form a "puzzle joint." As employed herein, the term "puzzle joint" refers to a joint formed by the interlocking engagement of one or more tabs and correspondingly shaped and positioned slots where at least some portion of each tabs' outer contour extends laterally in an outward direction, that is at least one edge of the tab profile extends laterally in an outward direction from a line perpendicular to the tab base in an outward direction with respect to the tab base. Examples of such tab configurations are shown in FIG. 9. FIG. 9 depicts several tab configurations where the tab does not have an "enlarging profile outer contour" but still is capable of forming a "puzzle joint." As used herein, the term "enlarging profile outer contour" refers to a tab shape in which at least a portion of the tab at a position extended from the tab base has a dimension which is larger than the width of the tab base (see e.g., the tab and slot configuration depicted FIG. 3).

As discussed above, in certain embodiments the insulating module layers may be positioned in a side-by-side orientation and then by applying a compressive force to the outer major faces of the two outermost insulating module layers, the total thickness of the combined layers is compressed down to a desired thickness. Such layers are referred to a "compressingly engaged." The term "compression factor" is used herein to refer to the amount of compression applied used herein the term "compression factor" refers to the ratio—(the total thickness of the combined insulating module layers before compression):(the total thickness of the combined insulating module layers after compression). Where this technique is employed in the production of the present term modules, an insulating module suitably has a compression factor ("CF") of at least about 1.05. Modules with compression factors ranging from about 1.05 to 2 are quite suitable for use in the present insulation methods. Quite commonly, the present insulating modules may have a compression factor of about 1.1 to 1.5.

In the puzzle joints described herein, the slot may be configured to extend completely through the thickness of an insulating module layer section, that is the inner contour of the slot extends completely through from one major surface to the opposing major surface of the section. In some embodiments, however, the slot may be a groove in which the inner contour extends only partially into that thickness of the insulating module layer section, that is where the inner contour of the slot does not extend completely through from one major surface to the opposing major surface of the section. In each case, the shape and thickness of the tab on the corresponding other section of the insulating module layer is commonly configured in a substantially similar manner such that the tab and slot can be positioned in interlocking engagement. To avoid confusion, as used herein, the terms "outer contour" (in reference to a tab) and "inner contour" (in reference to a slot) refer to the contour of the tab or slot with respect to a major surface of the insulating module layer section intersected by the tab or slot.

Illustrative Embodiments

Reference is made in the following to a number of illustrative embodiments of the subject matter described herein. The following embodiments describe illustrative embodiments that may include various features, characteristics, and advantages of the subject matter as presently described. Accordingly, the following embodiments should not be considered as being comprehensive of all of the possible embodiments or otherwise limit the scope of the methods, materials and compositions described herein.

One embodiment provides a refractory module comprising a plurality of insulating module layers arranged such that their major surfaces are positioned in a side-by-side orientation. Each of the insulating module layers are commonly formed from a fibrous refractory blanket or mat. Each layer typically includes first and second sections joined together along a section juncture by the interlocking engagement of a tab extending from an edge of one section with a slot in an edge of the other section, where the slot has an inner contour which substantially corresponds in shape to the outer contour of the tab. Typically, the sections are positioned such that all of the first sections have an edge which is exposed to the hot face of the module and all of the second sections have an edge which is exposed to the cold face of the module. For example, each first section may include a hot face refractory insulation material having a temperature rating of about 3,000° F. (e.g., a mullite fiber material such as Maftec® 3000 Blanket with a density of about 6 pcf) and each second section may include a cold face refractory insulation material having a temperature rating of no more than about 2,600° F. (e.g., an alumina-silica-zirconia fiber material such as 2600 HTZ Blanket with a density of about 8 pcf).

In some exemplary embodiments, each tab may commonly be centrally positioned on a joint edge of the insulating module layer section from which it extends. The tabs are typically dimensioned such that the tab base has a width that is about 20-40% of the width of the insulating module layer (and correspondingly is typically about 20-40% of the width of the section edge from which it extends). Where such tabs have an enlarging outer contour, the widest portion of the tab contour may suitably have a width that is about 30-50% of the width of the insulating module layer. Such the tabs may have an enlarging trapezoid outer contour. Suitable tabs may have a tab extension length of at least about one inch and, commonly about one to two inches.

In one exemplary embodiment, the present insulating module includes insulating module layers in which the two sections of each layer are formed from different refractory insulation materials, typically in the form of a fibrous refractory mat or blanket. Commonly, the sections on the side of the module to be exposed to a furnace interior, the "hot face," are formed from a refractory insulation material which has a temperature rating which is at least about 400 or 500° F. higher than the temperature rating of the other sections which make up the "cold face" of the module. For example, the module layer sections exposed to the hot face may be formed from mullite fibers (with a temperature rating of about 3,000° F.) while the sections exposed on the cold face of the module may be formed from a refractory insulation material having a lower temperature rating, e.g., an alumina-silica-zirconia fiber material with a temperature rating of about 2,600° F.

The present insulating modules may be in the form of a cube, e.g., a twelve inch cube where the major faces of each insulating module layer measure about twelve (12) inches by twelve (12) inches and sufficient layers are positioned in a side-by-side orientation to create a twelve (12) inch thick module. This may be done by positioning twelve one (1) inch thick insulating module layers in a side-by-side orientation to create the twelve (12) inch thick module. In other embodiments, more than twelve one (1) inch thick insulating module layers, e.g., fourteen to sixteen of such insulating module layers may be positioned in a side-by-side orientation and then by applying a compressive force to the outer major faces of the two outermost insulating module layers, the total thickness of the combined layers is compressed down to about twelve (12) inches. Other embodiments may be formed by positioning eight to twelve insulating module layers with a one and one-half (1½) inch thickness in a side-by-side orientation and, if necessary, compressing the layers to provide a desired thickness of the insulating module.

In many embodiments, the module may also include the support member and anchor rods of a fastening device for attaching the insulating module to a furnace wall disposed in the module, e.g., in the manner depicted in FIGS. 5-7. The fastening device commonly includes a support member and at least one anchor rod disposed in a transverse orientation through at least a majority of the insulating module layers and, very often the fastening device includes two anchor rods which extend transversely completely through all but the two outermost insulating module layers. In these latter type embodiments, the anchor rods may extend partially into but not completely through the two outermost insulating module layers.

In another embodiment, the present application provides an insulating module which includes a plurality of insulating module layers arranged with their major surfaces in a side-by-side orientation, where each layer has a first section with one or more slots extending therein from its slot joint edge; and a second section with one or more tabs extending from a tab joint edge thereof. The first and second sections each comprise a refractory insulation material, e.g., the first and second sections may each be formed from a fibrous refractory blanket. Each tab on a second section is interlocking engaged with a paired slot in the corresponding first section (i.e., the first section from the same insulating module layer) and each slot has an inner contour which substantially corresponds in shape to an outer contour of its paired tab. As illustrated by FIGS. 8 and 10, the first and second sections may have two or three (or more) interlocking engaged correspondingly contoured tab and slot pairs, which hold the two sections in juxtaposition along the section juncture.

In another embodiment, the present application provides an insulating module which includes a plurality of insulating module elements. The insulating module elements may have a flattened rectangular box shape and be arranged with their major surfaces in a side-by-side orientation. Often the major surfaces of the insulating module elements may have a substantially square shape (i.e., square prism shape). Each insulating module element may include one or two hot face pieces, which may be formed from refractory insulation material, and one or two cold face pieces, which may also be formed from refractory insulation material (typically a different refractory insulation material from that used to form the hot face piece(s)). For example, an insulating module element may be formed by folding a "hot face" fibrous refractory blanket in a "U-shape" and joining the ends ("joint edges") of the U-shaped piece to the joint edges of two pieces of "cold face" fibrous refractory blanket (see, e.g., illustrative insulating module element depicted in FIGS. 11 and 12). Each of the "cold face" refractory insulation pieces may have one or more tabs extending from the tab joint edge thereof. The U-shaped folded hot face refractory insulation material may have one or more slots extending into its two joint edges. The slots may be configured such that they are aligned with paired tabs extending from the tab joint edges of the two cold face refractory insulation pieces and where for each tab/slot pair, the slot has an inner contour which substantially corresponds in shape to the tab outer contour. This allows the tab/slot pairs to be interlocking engaged and hold the tab joint edges of the two cold face pieces in juxtaposition with the joint edges of the U-shaped piece along respective section junctures. The "hot face" refractory insulation material U-shaped piece may be folded such that the two joint edges are offset, typically such that the offset distance is greater than the tab extension lengths of the tabs extending from the tab joint edges of the two cold face pieces of refractory insulation material.

The insulating modules described herein may be produced by a process which includes forming a plurality of insulating module layers or elements by interlockingly engaging a tab(s) on one or two cold face sections formed from refractory insulation material with a correspondingly positioned and shaped slot(s) in the joint edge(s) of a hot face section formed from refractory insulation material, such that the hot and cold face sections are held in juxtaposition along a section juncture(s). A plurality of the insulating module layers or elements are then positioned with their major surfaces positioned in a side-by-side orientation such that all of the hot face sections have an edge (or folded edge) exposed to one side of the bundle of layers/elements and all of the cold face sections have an edge exposed to an opposite side of the bundle of layers/elements. The insulating module layers/elements are typically positioned such that adjacent layers/elements have section junctures located in a manner such that each section juncture is offset with respect to the section juncture in any adjacent layer/element. In most instances, this assembled bundle of insulating module layers/elements is then subjected to a compressive force applied to the outer major faces of the two outermost insulating module layers/elements. The bundle of layers/elements is then compressed until the total thickness of the combined layers/elements has been compressed by a desired amount, e.g., until a compression factor ("CF") of at least about 1.05 and, more commonly about 1.1 to 1.5, has been achieved. If desired, during the assembly of the bundle the layers/elements can be divided into two groups positioned in a side-by-side orientation and the anchor rod(s) of a fastening device can be inserted through spaced apart holes provided through the cold face sections of the insulating module layers/elements. The spaced apart holes are commonly dimensioned and adapted to receive the anchor rod(s) such that the rods extend transversely completely through all but the two outermost insulating module layers of a mounting assembly. The assembled bundle of insulating module layers/elements including the anchor rod(s) and any other desired pieces of a fastening device can then be subjected to a compression operation as described above.

It will be readily apparent to one skilled in the art that varying substitutions and modifications may be made to the methods and compositions disclosed herein without departing from the scope and spirit of the invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention. Thus, it should be understood that although the present invention has been illustrated by specific embodiments and optional features, modifications and/or variations of the concepts herein disclosed may be resorted to by those skilled in the art, and that such modifications and variations are considered to be within the scope of this invention.

In addition, where features or aspects of the invention are described in terms of Markush groups or other grouping of alternatives, those skilled in the art will recognize that the invention is also thereby described in terms of any individual member or subgroup of members of the Markush group or other group.

Also, unless indicated to the contrary, where various numerical values are provided for embodiments, additional embodiments are described by taking any two different values as the endpoints of a range. Such ranges are also within the scope of the invention described herein.

What is claimed is:

1. An insulating module comprising a plurality of insulating module layers arranged with their major surfaces in a side-by-side orientation, each layer comprising a first section having a slot extending therein from a slot joint edge; and a second section having a tab extending from a tab joint edge thereof;

wherein the slot has an inner contour which substantially corresponds in shape to an outer contour of the tab; the tab interlocking engaged in the slot such that the joint edges of the first and second sections are held in juxtaposition along a section juncture;

the first and second sections each comprise a fibrous refractory insulation material; and the section juncture in each insulating module layer is positioned such that the section junctures in any two adjacent layers are offset with respect to each other.

2. The module of claim 1 wherein each tab has an enlarging profile outer contour.

3. The module of claim 1 wherein each first section comprises a first fibrous refractory material; and each second section comprises a second fibrous refractory material which is different from the first fibrous refractory material.

4. The module of claim 3 wherein the first fibrous refractory material has a temperature rating which is at least about 100° F. higher than a temperature rating of the second fibrous refractory material.

5. The module of claim 3 wherein the first fibrous refractory material has a temperature rating of about 3,000° F.; and the second fibrous refractory material has a temperature rating of no more than about 2,600° F.

6. The module of claim 1 wherein each of the first and second sections comprise fibrous refractory materials comprising soluble fibers, fiber glass, mineral fibers, alumina fibers, zirconia fibers, alumina-zirconia fibers, alumina-silica-zirconia fibers, alumina-silica fibers, and/or chromia-alumina-silica fibers.

7. The module of claim 1 wherein all of the first sections have an edge which is exposed to a hot face of the module; and all of the second sections have an edge which is exposed to a cold face of the module.

8. The module of claim 7 wherein the first section of each insulating module layer includes a hot face fibrous refractory material comprising mullite fibers; and the second section of each insulating module layer comprises a cold face fibrous refractory material comprising alumina-silica-zirconia fibers.

9. The module of claim 1 wherein each tab has an extension length, which is less than an offset distance between the section juncture in its layer and the section juncture in any adjacent layer.

10. The module of claim 9 wherein each first section has a tab clearance of at least about two inches.

11. The module of claim 1 wherein the plurality of insulating module layers are compressingly engaged by application of a compressive force in a direction substantially perpendicular to the major surfaces of the insulating module layers such that the module has a compression factor of at least about 1.05.

12. The module of claim 1 further comprising a fastening device for attaching the insulating module to an inner surface of a furnace; wherein the fastening device comprises a support member and at least one anchor rod disposed in a transverse orientation through at least a majority of the insulating module layers.

13. The module of claim 12 wherein the at least one anchor rod is disposed in a transverse orientation through each second section of the at least a majority of insulating module layers.

14. The module of claim 1 wherein each tab has an outer contour in which at least one edge of the contour extends in an outward direction from a line perpendicular to a tab base of the tab.

15. The module of claim 1 wherein in each second section, the tab has an enlarging profile outer contour and is centrally positioned on the tab joint edge;

and each tab has an extension length, which is less than an offset distance between a tab base of the tab and the section juncture in any adjacent insulating module layer; and all of the first sections have an edge which is exposed to a hot face of the module; and all of the second sections have an edge which is exposed to a cold face of the module.

16. The module of claim 15 wherein each first section has a density of about 5-9 pcf and comprises a hot face fibrous refractory material comprising mullite fibers; and each second section has a density of about 4-10 pcf and comprises a cold face fibrous refractory material comprising alumina-silica-zirconia fibers.

17. The module of claim 16 wherein each centrally positioned tab has an enlarging trapezoid outer contour and has a tab extension length of at least about one inch and a tab base which is about 20-40% of a width of the second section;

each first section has a tab clearance of at least about 2 inches; and the insulating module layers are compressingly engaged such that the module has a compression factor of at least about 1.1.

18. The module of claim 1 wherein each first section has a density of about5-9 pcf;

and each second section has a density of about 4-10 pcf.

19. The module of claim 1 wherein the insulating module layers are compressingly engaged such that the module has a compression factor of at least about 1.1.

20. An insulating module comprising a plurality of insulating module layers arranged with major surfaces in a side-by-side orientation, each layer comprising a first section having at least one slot extending therein from a slot joint edge; and a second section having at least one tab extending from a tab joint edge thereof;

wherein each tab is interlocking engaged with a paired slot on the first section and each slot has an inner contour which substantially corresponds in shape to an outer contour of its paired tab; whereby the joint edges of the first and second sections are held in juxtaposition along a section juncture; and the first and second sections each comprise a fibrous refractory insulation material; and the section juncture in each insulating module layer is positioned such that the section junctures in any two adjacent layers are offset with respect to each other.

21. The module of claim 20 wherein in each second section, each tab has an enlarging profile outer contour.

22. The module of claim 20 wherein all of the first sections are exposed to a hot face of the module and each first section comprises mullite fibers; and all of the second sections have an edge which is exposed to a cold face of the module and each second section comprises alumina-silica-zirconia fibers.

23. The module of claim 20 wherein each tab an extension length, which is less than an offset distance between the section juncture in its layer and the section juncture in any adjacent layer.

24. The module of claim 20 wherein each first section has a density of about 5-9 pcf;

and each second section has a density of about 4-10 pcf.

25. The module of claim 20 wherein the insulating module layers are compressingly engaged such that the module has a compression factor of at least about 1.1.

26. An insulating module comprising a plurality of insulating module elements arranged with major surfaces in a side-by-side orientation;

each element comprising a U-shaped fibrous refractory section having at least one slot extending therein from each of its two slot joint edges; and two second fibrous refractory sections each having at least one tab extending from a tab joint edge thereof;

wherein each tab is interlocking engaged with a paired slot on the corresponding slot joint edge and each slot has an inner contour which substantially corresponds in shape to an outer contour of its paired tab; whereby the joint edge of each second fibrous refractory section is held in juxtaposition with one of the slot joint edges of the U-shaped fibrous refractory section along a section juncture; and each section juncture is positioned such that the section junctures in any two adjacent insulating module elements are offset with respect to each other.

27. The module of claim 26 wherein each U-shaped fibrous refractory section is folded such that the two slot joint edges are offset by an offset distance which is greater than the tab extension lengths of the at least one paired tab extending from the second fibrous refractory sections.

* * * * *